United States Patent
Zhu

(10) Patent No.: US 12,451,998 B2
(45) Date of Patent: Oct. 21, 2025

(54) METHOD AND DEVICE FOR HYBRID AUTOMATIC REPEAT REQUEST (HARQ) TRANSMISSION, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 393 days.

(21) Appl. No.: 18/003,898

(22) PCT Filed: Aug. 3, 2020

(86) PCT No.: PCT/CN2020/106656
§ 371 (c)(1),
(2) Date: Dec. 29, 2022

(87) PCT Pub. No.: WO2022/027198
PCT Pub. Date: Feb. 10, 2022

(65) Prior Publication Data
US 2023/0269031 A1  Aug. 24, 2023

(51) Int. Cl.
*H04L 1/18* (2023.01)
*H04L 1/1812* (2023.01)
(Continued)

(52) U.S. Cl.
CPC ........... *H04L 1/1812* (2013.01); *H04W 72/23* (2023.01); *H04W 84/06* (2013.01)

(58) Field of Classification Search
CPC ........................... H04L 1/1812; H04W 72/23
See application file for complete search history.

(56) References Cited

U.S. PATENT DOCUMENTS

| | | | |
|---|---|---|---|
| 2011/0237283 A1 | 9/2011 | Shan et al. | |
| 2013/0230017 A1* | 9/2013 | Papasakellari | ........ H04W 72/23 |

(Continued)

FOREIGN PATENT DOCUMENTS

| | | |
|---|---|---|
| CN | 103139868 A | 6/2013 |
| CN | 104935415 A | 9/2015 |

(Continued)

OTHER PUBLICATIONS

International Search Report Issued Apr. 21, 2021, in PCT/CN2020/106656, filed on Aug. 3, 2020, 2 pages.
(Continued)

*Primary Examiner* — Ronald B Abelson
(74) *Attorney, Agent, or Firm* — Oblon, McClelland, Maier & Neustadt, L.L.P.

(57) ABSTRACT

A method and a device for Hybrid Automatic Repeat reQuest (HARQ) transmission, and a storage medium. The method can include determining number of target HARQ process(es) supported by a terminal, in response to the number of the target HARQ process(es) being greater than a target number, determining a target scrambling sequence, the target number being the maximum value indicated by a target information field configured to indicate number of HARQ process(es) in Downlink Control Information (DCI), and sending, to the terminal, the DCI scrambled through the target scrambling sequence.

20 Claims, 10 Drawing Sheets

(51) Int. Cl.
*H04W 72/23* (2023.01)
*H04W 84/06* (2009.01)

| CN | 111294939 A | 6/2020 |
| EP | 2 632 077 A2 | 8/2013 |
| WO | WO 2019/245662 A1 | 12/2019 |

(56) References Cited

U.S. PATENT DOCUMENTS

| 2015/0178762 A1* | 6/2015 | La Point | G06Q 30/0227 |
| 2020/0163113 A1 | 5/2020 | Zhu | |
| 2020/0205157 A1 | 6/2020 | Zhu | |
| 2021/0058145 A1* | 2/2021 | Alasti | H04B 7/088 |
| 2021/0242995 A1* | 8/2021 | Noh | H04W 72/1273 |

FOREIGN PATENT DOCUMENTS

| CN | 105978671 A | 9/2016 |
| CN | 108631905 A | 10/2018 |
| CN | 109699075 A | 4/2019 |
| CN | 110730513 A | 1/2020 |

OTHER PUBLICATIONS

Status Report to TSG, "Study on New Radio Access Technology," 3GPP TSG RAN meeting #75 (RP-170376), Dubrovnik, Croatia, Mar. 6-9, 2017, 157 pages.
Change Request, "Introduction of eFD-MIMO into 36.212", 3GPP TSG-RAN Meeting #88 (R1-1704149), Athens, Greece, Feb. 13-17, 2017, 124 pages.
Li, Xiaowen, et al., "Implementation of DCI Format Detection and Transmission Scheme Confirmation of PDSCH in LTE System", *Transmitting & Receiving*, 7 pages.
Chinese First Office Action with English Translation mailed on Oct. 9, 2018 in Chinese Application No. 202080001742.
Combined Chinese Office Action and Search Report issued May 31, 2023 in Chinese Application 202080001742.X, 3 pages.

* cited by examiner

METHOD AND DEVICE FOR HYBRID AUTOMATIC REPEAT REQUEST (HARQ) TRANSMISSION, AND STORAGE MEDIUM

CROSS REFERENCE

The present disclosure is a U.S. national phase application of International Application No. PCT/CN2020/106656 filed on Aug. 3, 2020, which is incorporated herein by reference in its entirety.

BACKGROUND OF THE INVENTION

Field of the Invention

The present disclosure relates to the communication field, in particular to a method and a device for Hybrid Automatic Repeat reQuest (HARQ) transmission, and a storage medium.

Description of the Related Art

In an LTE (Long Term Evolution) system, there is a timing relationship existed between data transmission and HARQ (Hybrid Automatic Repeat reQuest) feedback time. In a 5G (5th generation mobile networks) NR (New Radio) system, a flexible HARQ feedback mechanism can be supported and a position of the HARQ transmission in the time domain can be dynamically indicated.

For a satellite communication system, a satellite is at a distance far from a terminal, resulting in a large RTT (Round Trip Time). In the current HARQ design, the terminal supports up to 16 HARQ processes. For satellite communication scenarios, the terminal may need to support more HARQ processes.

SUMMARY OF THE INVENTION

A more complete appreciation of the invention and many of the attendant advantages thereof will be readily obtained as the same becomes better understood by reference to the following detailed description when considered in connection with the accompanying drawings.

Embodiments of the present disclosure provide a method and a device for Hybrid Automatic Repeat reQuest (HARQ) transmission, and a storage medium.

According to one aspect of embodiments of the present disclosure, a method for Hybrid Automatic Repeat reQuest (HARQ) transmission is provided. The method is applied to a satellite, and includes determining number of target HARQ process(es) supported by a terminal, determining a target scrambling sequence in response to the number of the target HARQ process(es) being greater than a target number, wherein the target number is a maximum value indicated by a target information field configured to indicate number of HARQ process(es) in Downlink Control Information (DCI), and sending the DCI scrambled through the target scrambling sequence to the terminal.

According to another aspect of embodiments of the present disclosure, a method for Hybrid Automatic Repeat reQuest (HARQ) transmission is provided. The method is applied to a terminal, and includes receiving Downlink Control Information (DCI) sent by a satellite; and determining, in response to determination that a target scrambling sequence used to scramble the DCI belongs to one of a plurality of preset scrambling sequences, number of target HARQ process(es) supported by the terminal based on the DCI and the target scrambling sequence.

According to another aspect of embodiments of the present disclosure, an apparatus for Hybrid Automatic Repeat reQuest (HARQ) transmission is provided. The apparatus is applied to a satellite, and includes a first determination module configured to determine number of target HARQ process(es) supported by a terminal, a second determination module configured to determine a target scrambling sequence in response to the number of the target HARQ process(es) being greater than a target number, wherein the target number is a maximum value indicated by a target information field configured to indicate number of HARQ process(es) in Downlink Control Information (DCI), and a first sending module configured to send the DCI scrambled through the target scrambling sequence to the terminal.

According to another aspect of embodiments of the present disclosure, an apparatus for Hybrid Automatic Repeat reQuest (HARQ) transmission is provided. The apparatus is applied to a terminal, and includes a second receiving module configured to receive Downlink Control Information (DCI) sent by a satellite, and a fifth determination module configured to determine, in response to determination that a target scrambling sequence used to scramble the DCI belongs to one of a plurality of preset scrambling sequences, number of target HARQ process(es) supported by the terminal based on the DCI and the target scrambling sequence.

According to another aspect of embodiments of the present disclosure, a computer-readable storage medium is provided. The storage medium stores a computer program thereon, wherein the computer program is configured to implement the method for Hybrid Automatic Repeat reQuest (HARQ) transmission according to any of above aspects.

According to another aspect of embodiments of the present disclosure, a device for Hybrid Automatic Repeat reQuest (HARQ) transmission is provided, including a processor and a memory for storing instructions executable by the processor. The processor is configured to perform the method for Hybrid Automatic Repeat reQuest (HARQ) transmission according to any of above aspects.

It should be understood that the above general description and the following detailed description are only illustrative and explanatory, and should not limit the present disclosure.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION OF THE PREFERRED EMBODIMENTS

Figure 1A:
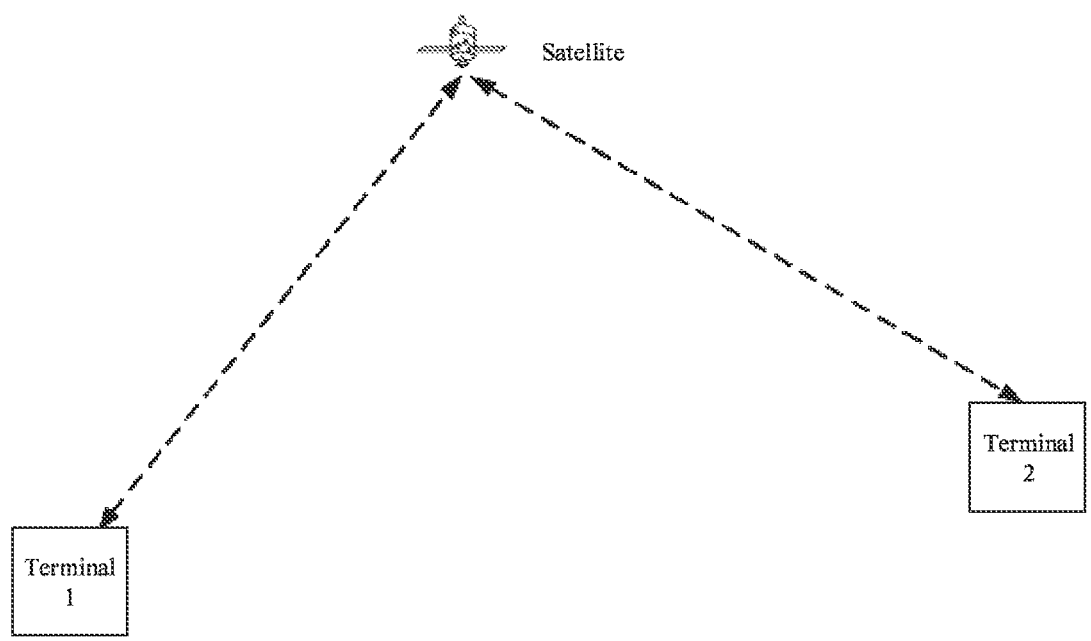
FIG. 1A is a schematic diagram of a scenario applicable for Hybrid Automatic Repeat reQuest (HARQ) transmission shown according to exemplary embodiments.

Exemplary embodiments will be described in detail herein, and examples thereof are shown in the drawings. Unless otherwise indicated, the same number in different drawings indicates the same or similar elements when the following description refers to the drawings. Implementations described in the following exemplary embodiments do not represent all implementations consistent with the invention, instead, they are only examples of devices and methods consistent with some aspects of the present disclosure as detailed in the appended claims.

Terms used in the present disclosure are only for the purpose of describing specific embodiments, and are not intended to limit the present disclosure. Singular forms of "a(an)", "said" and "the" used in the present disclosure and the appended claims are also intended to include majority forms, unless it is clearly indicated other meanings in the context. It should also be understood that the term "and/or" as used herein refers to and includes any or all possible combinations of one or more listed items associated.

It should be understood that although terms such as "first", "second", and "third" may be used to describe various information in the present disclosure, but the information should not be limited to these terms. These terms are only used to distinguish the same type of information from each other. For example, without departing from the scope of the present disclosure, the first information can also be called as the second information, and similarly, the second information can also be called as the first information. The word "if" used herein can be interpreted as "when" or "as" or "in response to", depending on the context.

Figure 1B:
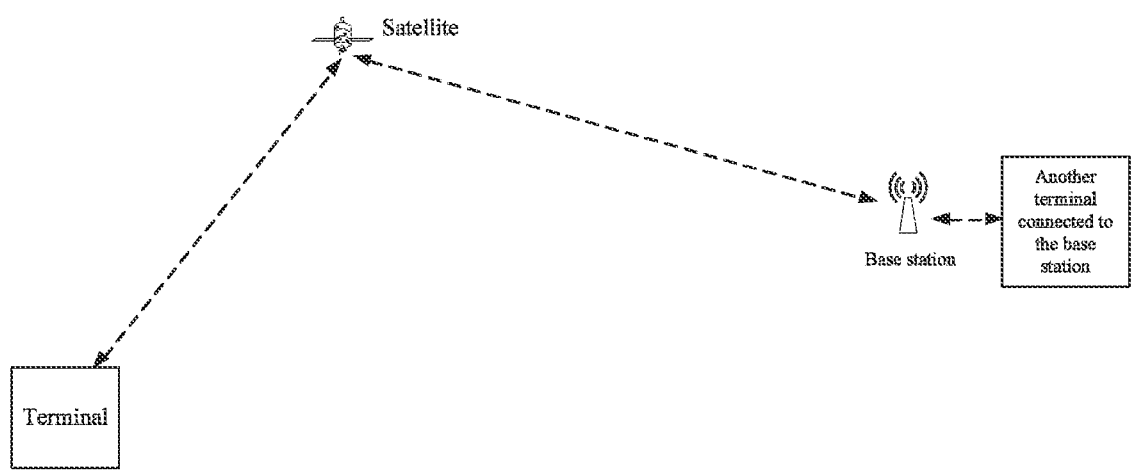
FIG. 1B is a schematic diagram of another scenario applicable for Hybrid Automatic Repeat reQuest (HARQ) transmission shown according to exemplary embodiments.

A solution for HARQ transmission provided by embodiments of the present disclosure can be used in the satellite communication system. An example scenario is shown in FIG. 1A, where data can be transmitted between terminals via the satellite, or another example scenario is shown in FIG. 1B, where the satellite is used as a relay and a base station transmits data to the satellite, and then the satellite transmits the data to a terminal.

The solution provided by the present disclosure can be applied in other scenarios requiring communication via the satellite.

A method for Hybrid Automatic Repeat reQuest (HARQ) transmission at a satellite side provided by the present disclosure will be described first in the following.

Figure 2:
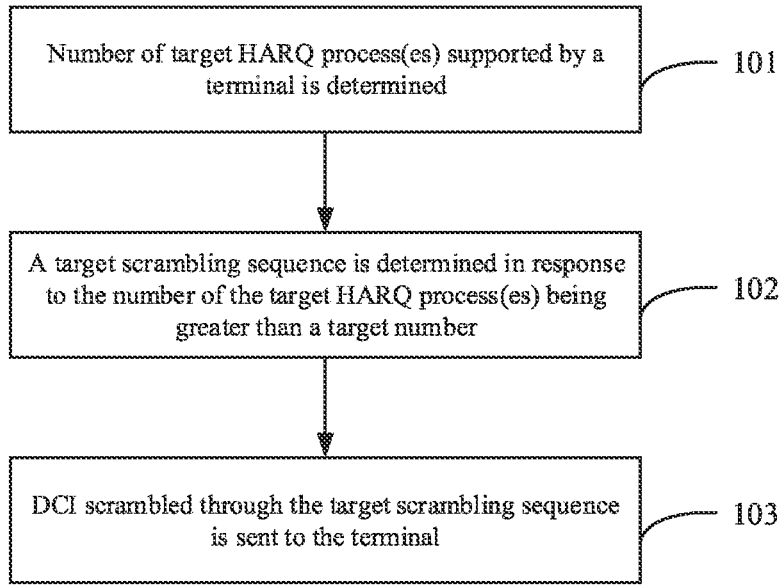
FIG. 2 is a schematic flowchart of a method for Hybrid Automatic Repeat reQuest (HARQ) transmission shown according to exemplary embodiments.

Embodiments of the present disclosure provide a method for Hybrid Automatic Repeat reQuest (HARQ) transmission, which can be applied to the satellite. FIG. 2 is a flowchart of a method for Hybrid Automatic Repeat reQuest (HARQ) transmission shown according to embodiments. As shown in FIG. 2, the method includes following steps.

In a step 101, number of target HARQ process(es) supported by a terminal is determined.

In embodiments of the present disclosure, the number of the target HARQ process(es) supported by the terminal is the maximum number of the HARQ process(es) that can be handled by the terminal concurrently.

In a step 102, a target scrambling sequence is determined in response to the number of the target HARQ process(es) being greater than a target number.

In embodiments of the present disclosure, the target number is the maximum value indicated by a target information field configured to indicate number of HARQ process(es) in the Downlink Control Information (DCI). For example, when a bit length occupied by the target information field is 4 bits, the maximum number of the HARQ process(es) that can be indicated is 16, that is, the target number is 16. For example, when the bit length occupied by the target information field is 5 bits, the maximum number of the HARQ process(es) that can be indicated is 32, that is, the target number is 32.

In a case where the satellite determines that the number of the target HARQ process(es) supported by the terminal exceeds the above target number, the target scrambling sequence can be determined.

In a step 103, DCI scrambled through the target scrambling sequence is sent to the terminal.

After receiving the scrambled DCI, in response to determination that the target scrambling sequence belongs to one of a plurality of preset scrambling sequences, the terminal will determine the number of the target HARQ process(es) supported by the terminal based on the DCI and the target scrambling sequence.

In above embodiments, the number of the target HARQ process(es) supported by the terminal exceeding the target number can be notified to the terminal without increasing the bit length occupied by the target information field configured to indicate the number of the HARQ process(es) in DCI.

In some embodiments, the step 101 may include following steps.

The number of the target HARQ process(es) supported by the terminal is determined based on terminal capability information reported by the terminal.

In embodiments of the present disclosure, the terminal capability information is information related to the HARQ process(es) supported by the terminal, including but not limited to the buffer size and other information.

The satellite determines the number of the target HARQ process(es) supported by the terminal based on the terminal capability information.

In above embodiments, the satellite can determine the number of the target HARQ process(es) supported by the terminal based on the terminal capability information reported by the terminal, which is simple in implementation and high in availability.

In some embodiments, if the satellite has been accessed by the terminal before and there is a historical record of the number of the target HARQ process(es) supported by the terminal existed in the satellite, the satellite can directly determine the number of the target HARQ process(es) supported by the terminal according to the historical record when the terminal accesses the satellite again.

Figure 3:
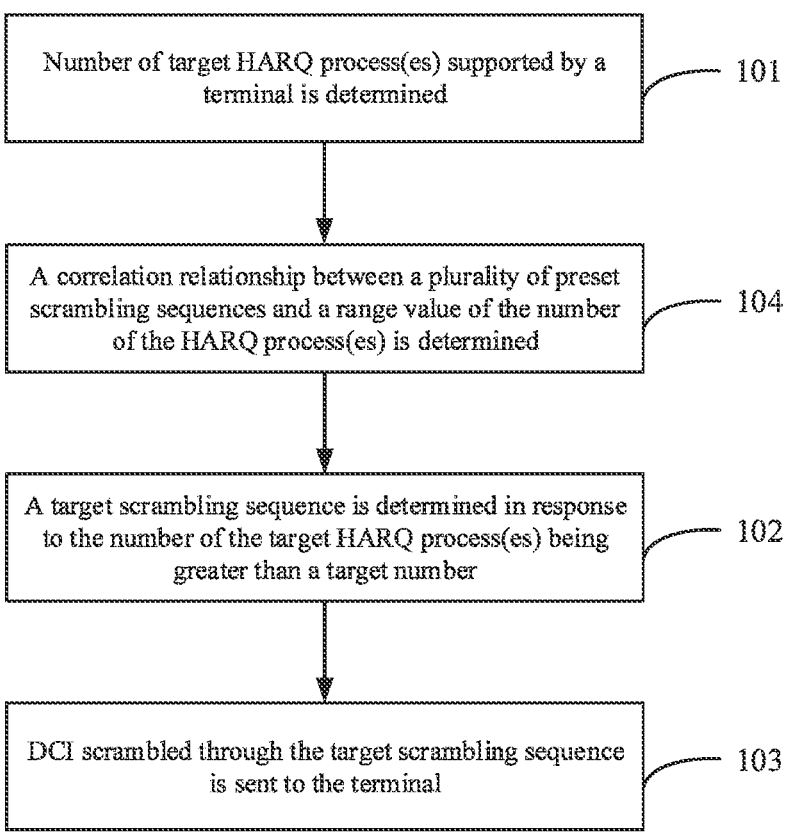
FIG. 3 is a schematic flowchart of another method for Hybrid Automatic Repeat reQuest (HARQ) transmission shown according to exemplary embodiments.

FIG. 3 is a flowchart of another method for Hybrid Automatic Repeat reQuest (HARQ) transmission shown according to embodiments shown in FIG. 2. In some embodiments, as shown in FIG. 3, the above method further includes following steps.

In a step 104, a correlation relationship between a plurality of preset scrambling sequences and a range value of the number of the HARQ process(es) is determined.

Figure 4:
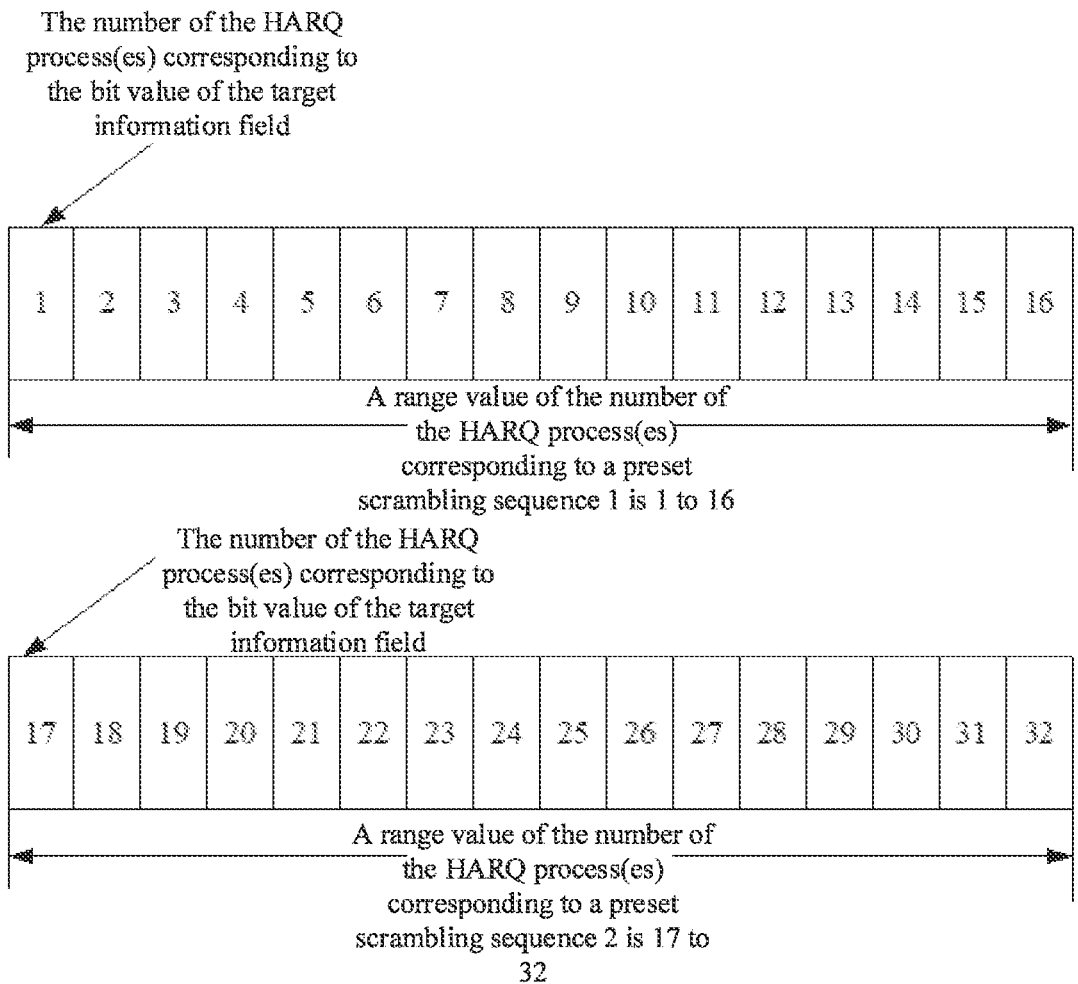
FIG. 4 is a schematic flowchart of another method for Hybrid Automatic Repeat reQuest (HARQ) transmission shown according to exemplary embodiments.

In some embodiments of the present disclosure, the correlation relationship between the plurality of the preset scrambling sequences and the range value of the number of the HARQ process(es) can be represented through a corresponding relationship between them. For example, a range value of the number of the HARQ process(es) corresponding to a preset scrambling sequence 1 is 1 to 16, and a range value of the number of the HARQ process(es) corresponding to a preset scrambling sequence 2 is 17 to 32, and so on, as shown in FIG. 4.

In above embodiments, the satellite can determine the correlation relationship between the plurality of the preset scrambling sequences and the range value of the number of the HARQ process(es), so as to determine subsequently the bit value corresponding to the target information field, so as to provide high availability.

Figure 5:
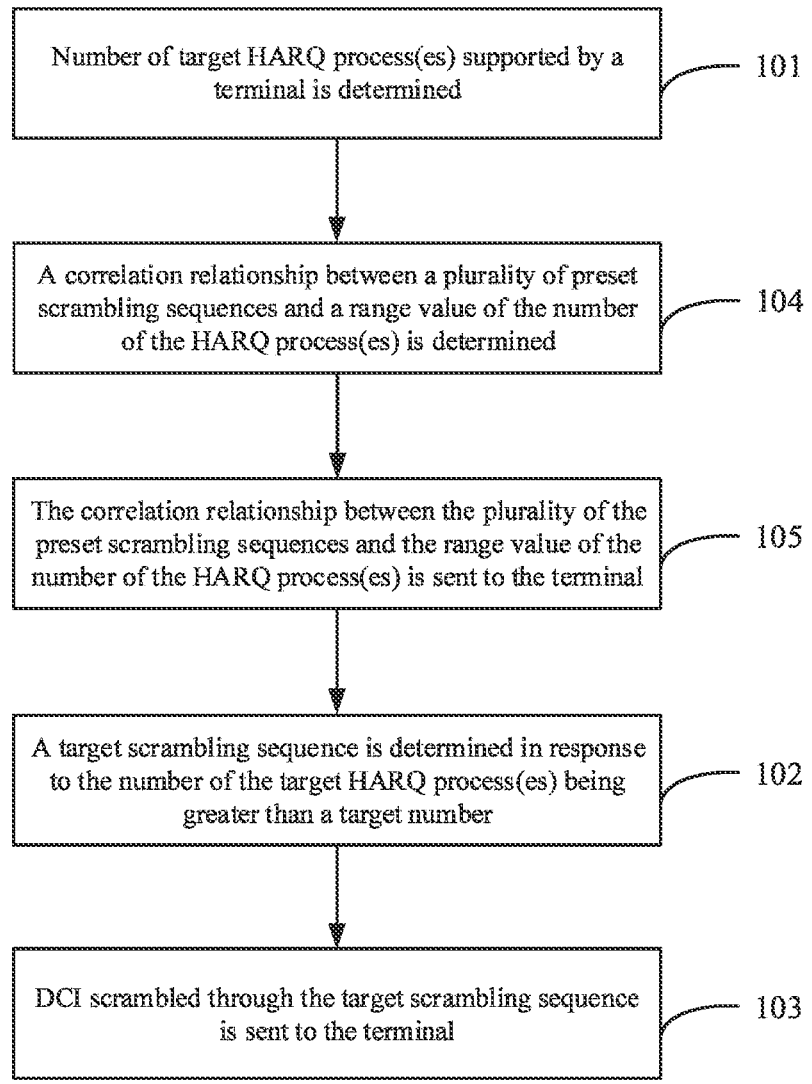
FIG. 5 is a schematic flowchart of another method for Hybrid Automatic Repeat reQuest (HARQ) transmission shown according to exemplary embodiments.

FIG. 5 is a flowchart of another method for Hybrid Automatic Repeat reQuest (HARQ) transmission shown according to embodiments shown in FIG. 2. In some embodiments, as shown in FIG. 5, the above method further includes following steps.

In a step 105, the correlation relationship between the plurality of the preset scrambling sequences and the range value of the number of the HARQ process(es) is sent to the terminal.

In some embodiments of the present disclosure, the satellite can send the above correlation relationship to the terminal through signaling. The signaling includes but is not limited to MAC (Media Access Control) signaling, RRC (Radio Resource Control) signaling, system messages, etc.

In above embodiments, the correlation relationship between the plurality of the preset scrambling sequences and the range value of the number of the HARQ process(es) can be sent to the terminal by the satellite through signaling, so that the terminal can subsequently determine the target number of the HARQ process(es) it supports, which is simple in implementation and high in availability.

In some embodiments, the step 102 may include following steps.

The target scrambling sequence is determined based on the number of the target HARQ process(es) and the correlation relationship between the plurality of the preset scrambling sequences and the range value of the number of the HARQ process(es).

In some embodiments of the present disclosure, a plurality of preset scrambling sequences are set for the case where the number of the target HARQ process(es) supported by the terminal is greater than the target number. The number of the preset scrambling sequences can be determined according to the number of the target HARQ process(es). Each time a preset scrambling sequence is increased, the number of the HARQ process(es) that can be indicated is increased the target number.

For example, if the target number is 16 and the number of the target HARQ process(es) is 32, then the number of the plurality of the preset scrambling sequences is 2. If the number of the target HARQ process(es) is 64, then the number of the plurality of the preset scrambling sequences is 4.

The satellite uses one of the plurality of the preset scrambling sequences as the target scrambling sequence to scramble the DCI, and the terminal can determine at the terminal side that the number of the target HARQ process(es) it supports is greater than the target number. In addition, in order for the terminal side to obtain a unique result when determining the target scrambling sequence corresponding to the DCI, the plurality of the preset scrambling sequences can be orthogonal with each other.

When determining the target scrambling sequence, the target scrambling sequence can be determined according to the number of the target HARQ process(es) and the above correlation relationship.

In some examples, the number of the target HARQ process(es) belongs to one of the target range value of the number of the HARQ process(es) corresponding to the target scrambling sequence.

For example, the number of the target HARQ process(es) is 32, the range value of the number of the HARQ process(es) corresponding to the preset scrambling sequence 2 is 17 to 32, thus the number of the target HARQ process(es) belongs to one of the range value of the number of the HARQ process(es) corresponding to the preset scrambling sequence 2, and then the preset scrambling sequence 2 can be used as the target scrambling sequence. The number of the target process(es) is 64, and the range value of the number of the HARQ process(es) corresponding to a preset scrambling sequence 4 is 49 to 64, thus the preset scrambling sequence 4 can be used as the target scrambling sequence.

In above embodiments, the satellite can determine the target scrambling sequence based on the number of the target HARQ process(es) supported by the terminal and the correlation relationship between the plurality of the preset scrambling sequences and the range value of the number of the HARQ process(es), so that the number of the target HARQ process(es) supported by the terminal exceeding the target number can be notified to the terminal without increasing the DCI signaling overhead.

Figure 6:
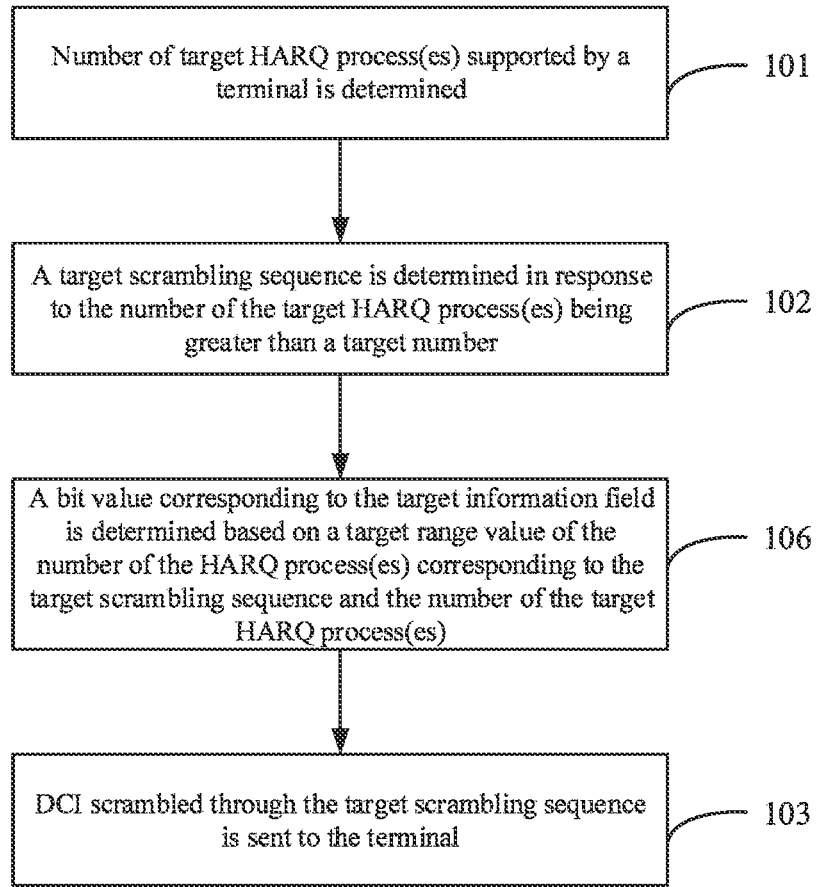
FIG. 6 is a schematic flowchart of another method for Hybrid Automatic Repeat reQuest (HARQ) transmission shown according to exemplary embodiments.

FIG. 6 is a flowchart of another method for Hybrid Automatic Repeat reQuest (HARQ) transmission shown according to embodiments shown in FIG. 2. In some embodiments, as shown in FIG. 6, the above method further includes following steps.

In a step 106, a bit value corresponding to the target information field is determined based on a target range value of the number of the HARQ process(es) corresponding to the target scrambling sequence and the number of the target HARQ process(es).

In some embodiments of the present disclosure, each of the number of the HARQ process(es) included in the target range value has a corresponding bit value in the target information field. For example, the bit length occupied by the target information field is 4 bits, and the target range value is 1 to 16. Then the bit value, corresponding to the number of the HARQ process(es) "1", in the target information field is 0000, the bit value, corresponding to the number of the HARQ process(es) "2", in the target information field is 0001, and so on. According to above correspondence, the bit value corresponding to the number of the target HARQ process(es) in the target information field can be determined.

In some other embodiments, the bit length occupied by the target information field is 4 bits, and the target range value of the number of the HARQ process(es) corresponding to the target scrambling sequence is 1 to 16. The bit value, corresponding to the number of the HARQ process(es) "1", in the target information field is 0000, the bit value, corresponding to the number of the HARQ process(es) "2", in the target information field is 0001, and so on. If the number of the target HARQ process(es) is 1, then in FIG. 4, it can be determined that the bit value corresponding to the target information field is 0000. The target range value of the number of the HARQ process(es) corresponding to the target scrambling sequence is 17 to 32. The bit value, corresponding to the number of the process(es) "17", in the target information field is also 0000. The number of the target HARQ process(es) is 17, and the bit value of the target information field is also 0000.

After determining the bit value corresponding to the target information field using the method described above, the satellite scrambles the DCI through the target scrambling sequence and sends the scrambled DCI to the terminal. Then the terminal can determine the number of the target HARQ process(es) supported by the terminal according to the bit value corresponding to the target information field in DCI and the target range value of the number of the HARQ process(es) corresponding to the target scrambling sequence.

In above embodiments, the number of the target HARQ process(es) supported by the terminal exceeding the target number is notified to the terminal without increasing DCI signaling overhead, so as to provide high availability.

A method for Hybrid Automatic Repeat reQuest (HARQ) transmission at a terminal side provided by the present disclosure will be described in the following.

Figure 7:
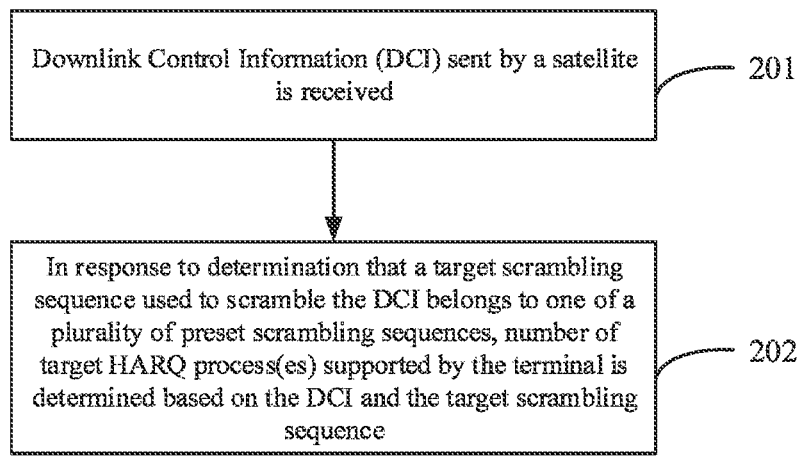
FIG. 7 is a schematic flowchart of another method for Hybrid Automatic Repeat reQuest (HARQ) transmission shown according to exemplary embodiments.

Embodiments of the present disclosure provide a method for Hybrid Automatic Repeat reQuest (HARQ) transmission, which can be applied to the terminal. FIG. 7 is another flowchart of a method for Hybrid Automatic Repeat reQuest (HARQ) transmission shown according to embodiments. As shown in FIG. 7, the method includes following steps.

In a step 201, Downlink Control Information (DCI) sent by a satellite is received.

In a step 202, in response to determination that a target scrambling sequence used to scramble the DCI belongs to one of a plurality of preset scrambling sequences, number of target HARQ process(es) supported by the terminal is determined based on the DCI and the target scrambling sequence.

In some embodiments of the present disclosure, the terminal can descramble the received DCI according to different scrambling sequences. In the case of successful descrambling, the target scrambling sequence used to scramble the DCI at the satellite side can be determined.

When the number of the target HARQ process(es) supported by the terminal exceeds the target number, a plurality of preset scrambling sequences are set. The number of the plurality of the preset scrambling sequences can be determined according to the number of the target HARQ process(es). Each time a preset scrambling sequence is increased, the number of the HARQ process(es) that can be indicated is increased the target number. The target number is the maximum value indicated by a target information field configured to indicate number of HARQ process(es) in the Downlink Control Information (DCI). For example, when a bit length occupied by the target information field is 4 bits, the maximum number of the HARQ process(es) that can be indicated is 16, that is, the target number is 16. For example, when the bit length occupied by the target information field is 5 bits, the maximum number of the HARQ process(es) that can be indicated is 32, that is, the target number is 32. The plurality of the preset scrambling sequences are orthogonal with each other.

If the terminal determines that the target scrambling sequence belongs to one of the plurality of the preset scrambling sequences, the number of the target HARQ process(es) supported by the terminal can be determined based on the DCI and the target scrambling sequence. The number of the target HARQ process(es) supported by the terminal is the maximum number of the HARQ process(es) that can be handled by the terminal concurrently, and in some embodiments of the present disclosure, the number of the target HARQ process(es) is greater than the target number.

In above embodiments, the terminal can receive the DCI sent by satellite. When determining that the target scrambling sequence used to scramble the DCI belongs to one of the plurality of the preset sequences, the terminal can determine the number of the target HARQ process(es) supported by the terminal based on the DCI and the target scrambling sequence, so as to enable the terminal to determine more target HARQ processes supported by itself without increasing the DCI signaling overhead.

Figure 8:
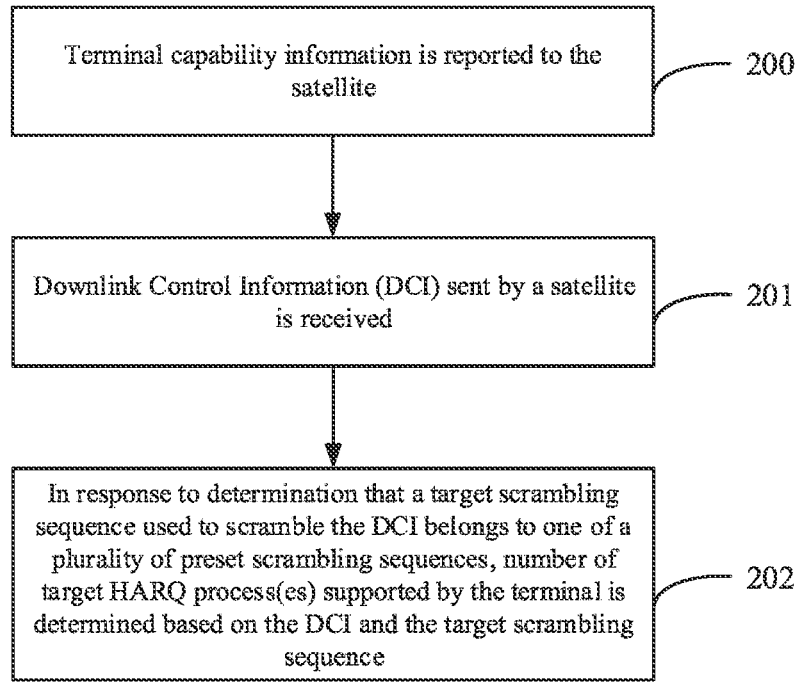
FIG. 8 is a schematic flowchart of another method for Hybrid Automatic Repeat reQuest (HARQ) transmission performed at a terminal shown according to exemplary embodiments.

FIG. 8 is a flowchart of another method for Hybrid Automatic Repeat reQuest (HARQ) transmission shown according to embodiments shown in FIG. 7. In some embodiments, as shown in FIG. 8, the above method further includes following steps.

In a step 200, terminal capability information is reported to the satellite.

In some embodiments of the present disclosure, the terminal capability information is information related to the HARQ process(es) supported by the terminal, including but not limited to the buffer size and other information.

The terminal reports its terminal capability information to the satellite, and the satellite can determine the number of the target HARQ process(es) supported by the terminal according to the terminal capability information, which is simple in implementation and high in availability.

Figure 9:
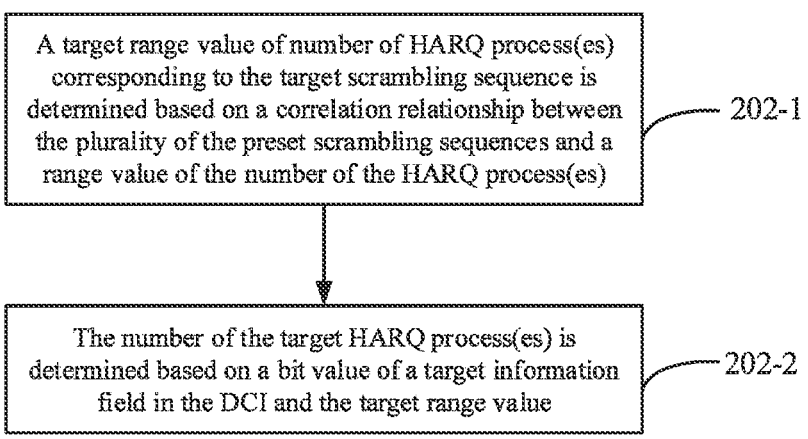
FIG. 9 is a schematic flowchart of another method for Hybrid Automatic Repeat reQuest (HARQ) transmission shown according to exemplary embodiments.

FIG. 9 is a flowchart of another method for Hybrid Automatic Repeat reQuest (HARQ) transmission shown according to embodiments shown in FIG. 7. In some embodiments, as shown in FIG. 9, the step 202 includes following steps.

In a step 202-1, a target range value of number of an HARQ process(es) corresponding to the target scrambling sequence is determined based on a correlation relationship between the plurality of the preset scrambling sequences and a range value of the number of the HARQ process(es).

For example, if the target scrambling sequence is a preset scrambling sequence 2, then according to the correlation relationship, the range value of the number of the HARQ process(es) corresponding to the preset scrambling sequence 2 is 17 to 32, thus the target range value of the number of the HARQ process(es) corresponding to the target scrambling sequence is also 17 to 32.

In a step 202-2, the number of the target HARQ process(es) is determined based on a bit value of a target information field in the DCI and the target range value.

In some embodiments of the present disclosure, the target information field is an information field used to indicate the number of the HARQ process(es) in the DCI. On the basis that the target range value of the number of the HARQ process(es) corresponding to the target scrambling sequence has been determined, each of the number of the HARQ process(es) included in the target range value corresponds to different bit values in the target information field. According to above correspondence, the number of the HARQ process(es), corresponding to the bit value of the target information field, in the target range value can be taken as the number of the target HARQ process(es).

For example, the target range value is 17 to 32, the bit value of the target information field, corresponding to the number of the HARQ process(es) "17", in the target range value is 0000, the bit value of the target information field corresponding to the number of the HARQ process(es) "18" is 0001, and so on. If the bit value of the target information field in the received DCI is 0000, it can be determined that the number of the target HARQ process(es) is 17. For another example, the bit value corresponding to the target information field in the received DCI is 0010, it can be determined, according to the above correspondence, that the number of the target HARQ process(es) is 19.

In above embodiments, based on the correlation relationship between the plurality of the preset scrambling sequences and the range value of the number of the HARQ process(es), the terminal can determine the target range value of the number of the HARQ process(es) corresponding to the target scrambling sequence used to scramble the DCI. Further, the number of the target HARQ process(es) can be determined based on the bit value of the target information field in the DCI and the target range value. Herein, the target information field is the information field used to indicate the number of the HARQ process(es) in the DCI. As a result, the terminal is enabled to determine more target HARQ processes supported by itself without increasing the bit length occupied by the target information field in DCI.

In some embodiments, the terminal can use at least one of the following methods to determine the correlation relationship between the plurality of the preset scrambling sequences and the range value of the number of the HARQ process(es).

According to a first method, the correlation relationship between the plurality of the preset scrambling sequences and the range value of the number of the HARQ process(es) is received from the satellite.

According to a second method, the correlation relationship between the plurality of the preset scrambling sequences and the range value of the number of the HARQ process(es) is determined according to a predetermined setting.

In some embodiments, the predetermined setting include but are not limited to those engagements in an agreement.

In above embodiments, the terminal can receive the correlation relationship between the plurality of the preset scrambling sequences and the range value of the number of the HARQ process(es), sent by the satellite, and/or determine the correlation relationship between the plurality of the preset scrambling sequences and the range value of the number of the HARQ process(es) according to a predetermined setting, so as to provide high availability.

Figure 10:
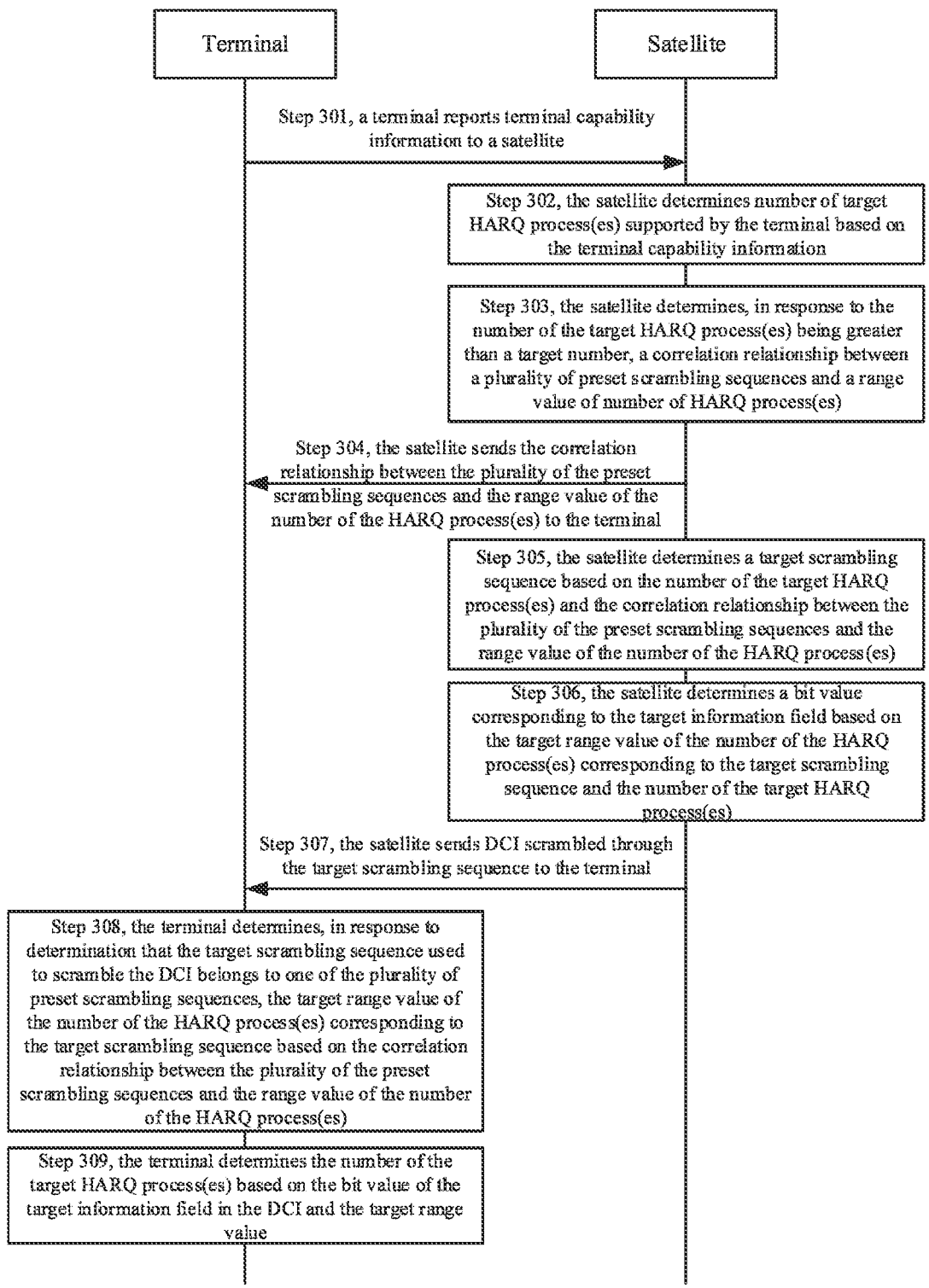
FIG. 10 is a schematic flowchart of another method for Hybrid Automatic Repeat reQuest (HARQ) transmission shown according to exemplary embodiments.

FIG. 10 is a flowchart of another method for Hybrid Automatic Repeat reQuest (HARQ) transmission shown according to embodiments. As shown in FIG. 10, the method can include following steps.

In a step 301, a terminal reports terminal capability information to a satellite.

The terminal capacity information is information related to the HARQ process(es) supported by the terminal, including but not limited to the buffer size and other information.

In a step 302, the satellite determines number of target HARQ process(es) supported by the terminal based on the terminal capability information.

The number of the target HARQ process(es) supported by the terminal is the maximum number of the HARQ process(es) that can be handled by the terminal concurrently.

In a step 303, the satellite determines, in response to the number of the target HARQ process(es) being greater than a target number, a correlation relationship between a plurality of preset scrambling sequences and a range value of number of HARQ process(es).

In a step 304, the satellite sends the correlation relationship between the plurality of the preset scrambling sequences and the range value of the number of the HARQ process(es) to the terminal.

In some embodiments of the present disclosure, the step 304 can also be omitted.

In a step 305, the satellite determines a target scrambling sequence based on the number of the target HARQ process(es) and the correlation relationship between the plurality of the preset scrambling sequences and the range value of the number of the HARQ process(es).

The target number is the maximum value indicated by the target information field configured to indicate number of HARQ process(es) in the Downlink Control Information (DCI). In some embodiments of the present disclosure, the number of the target HARQ process(es) belongs to one of the target range value of the number of the HARQ process(es) corresponding to the target scrambling sequence.

In a step 306, the satellite determines a bit value corresponding to the target information field based on the target range value of the number of the HARQ process(es) corresponding to the target scrambling sequence and the number of the target HARQ process(es).

In a step 307, the satellite sends DCI scrambled through the target scrambling sequence to the terminal.

In a step 308, the terminal determines, in response to determination that the target scrambling sequence used to scramble the DCI belongs to one of the plurality of preset scrambling sequences, the target range value of the number of the HARQ process(es) corresponding to the target scrambling sequence based on the correlation relationship between the plurality of the preset scrambling sequences and the range value of the number of the HARQ process(es).

In some embodiments of the present disclosure, if above step 304 is omitted, the terminal can determine the correlation relationship between the plurality of the preset scrambling sequences and the range value of the number of the HARQ process(es) according to a predetermined setting. Further, the target range value of the number of the HARQ process(es) corresponding to the target scrambling sequence is determined.

In a step 309, the terminal determines the number of the target HARQ process(es) based on the bit value of the target information field in the DCI and the target range value.

In above embodiments, the number of the target HARQ process(es) supported by the terminal exceeding the target number can be notified to the terminal without increasing the bit length occupied by the target information field configured to indicate the number of the HARQ process(es) in DCI, which saves the DCI signaling overhead, so that the terminal can support more HARQ processes.

According to embodiments of the present disclosure, the satellite can determine the number of the target HARQ process(es) supported by the terminal. When the number of the target HARQ process(es) is greater than the target number, the satellite can determine the target scrambling sequence, scramble the DCI through the target scrambling sequence, and send the scrambled DCI to the terminal. The target number is the maximum value indicated by the target information field configured to indicate the number of the HARQ process(es) in DCI. The present disclosure can inform the terminal of the number of the target HARQ process(es) supported by the terminal that exceeds the target number without increasing the bit length occupied by the target information field configured to indicate the number of the HARQ process(es) in the DCI.

According to embodiments of the present disclosure, the satellite can determine the number of the target HARQ process(es) supported by the terminal based on the terminal capability information reported by the terminal, which is simple in implementation and high in availability.

According to embodiments of the present disclosure, the satellite can determine the correlation relationship between the plurality of the preset scrambling sequences and the range value of the number of the HARQ process(es), so as to determine the bit value corresponding to the target information field, so as to provide high availability.

According to embodiments of the present disclosure, the satellite can send the correlation relationship to the terminal, so that the terminal can determine the number of the target HARQ process(es) it supports according to the correlation relationship, which is high in availability.

According to embodiments of the present disclosure, based on the number of the target HARQ process(es)es supported by the terminal and the correlation relationship between the plurality of the preset scrambling sequences and the range value of the number of the HARQ process(es), the satellite can determine the target scrambling sequence which needs to scramble the DCI, so that the terminal can be informed of the number of the target HARQ process(es) that exceeds the target number supported by the terminal without increasing the DCI signaling overhead.

According to embodiments of the present disclosure, the satellite can determine the bit value corresponding to the target information field based on the target range value of the number of the HARQ process(es) corresponding to the target scrambling sequence and the number of the target HARQ process(es). So that the terminal can determine the number of the target HARQ process(es) it supports according to the bit value corresponding to the target information field and the target range value of the number of the HARQ process(es) corresponding to the target scrambling sequence, so as to inform the terminal of the number of the target HARQ process(es) supported by the terminal that exceeds the target number without increasing the DCI signaling overhead.

According to embodiments of the present disclosure, the terminal can receive the DCI sent by the satellite. When it is determined that the target scrambling sequence used to scramble the DCI belongs to one of the plurality of preset sequences, the number of the target HARQ process(es) supported by the terminal can be determined based on the DCI and the target scrambling sequence, which enables the terminal to determine more target HARQ processes supported by itself without increasing the DCI signaling overhead.

According to embodiments of the present disclosure, the terminal can determine the target range value of the number of the HARQ process(es) corresponding to the target scrambling sequence used to scramble the DCI, based on the correlation relationship between the plurality of the preset scrambling sequences and the range value of the number of the HARQ process(es). Further, the number of the target HARQ process(es) can be determined based on the bit value of the target information field in the DCI and the target range value. The target information field is the information field configured to indicate the number of the HARQ process(es) in the DCI. It enables the terminal to determine more target HARQ processes supported by itself without increasing the bit length occupied by the target information field in DCI.

According to embodiments of the present disclosure, the terminal can receive the correlation relationship between the plurality of the preset scrambling sequences and the range value of the number of the HARQ process(es) sent by the satellite, and/or determine the correlation relationship between the plurality of the preset scrambling sequences and the range value of the number of the HARQ process(es) according to a predetermined setting, so as to provide high availability.

The present disclosure also provides embodiments of an apparatus in which the method for achieving the function is applied, corresponding to above method embodiments.

Figure 11:
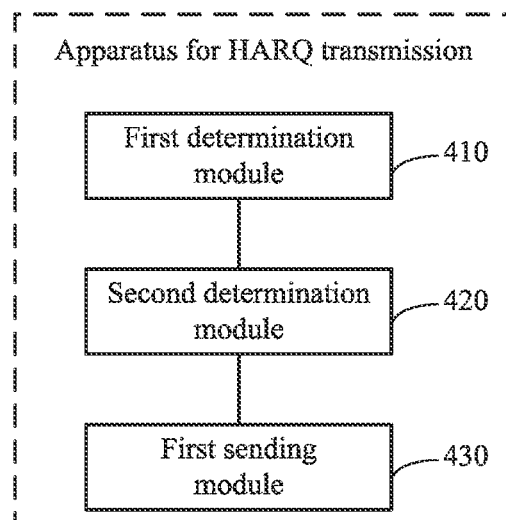
FIG. 11 is a block diagram of an apparatus for Hybrid Automatic Repeat reQuest (HARQ) transmission shown according to exemplary embodiments.

Referring to FIG. 11, which is a block diagram of an apparatus for Hybrid Automatic Repeat reQuest (HARQ) transmission shown according to exemplary embodiments. The apparatus is applied to the satellite, and includes a first determination module, a second determination module and a first sending module.

The first determination module 410 is configured to determine number of target HARQ process(es) supported by a terminal.

The second determination module 420 is configured to determine, in response to the number of the target HARQ process(es) being greater than a target number, a target scrambling sequence. Herein, the target number is the maximum value indicated by the target information field configured to indicate the number of the HARQ process(es) in the Downlink Control Information (DCI).

The first sending module 430 is configured to send DCI scrambled through the target scrambling sequence to the terminal.

In some embodiments, the first determination module includes a first determination sub-module.

The first determination sub-module is configured to determine the number of the target HARQ process(es) supported by the terminal based on terminal capability information reported by the terminal.

In some embodiments, the apparatus further includes a third determination module.

The third determination module is configured to determine a correlation relationship between a plurality of preset scrambling sequences and a range value of number of HARQ process(es).

In some embodiments, the apparatus further includes a second sending module.

The second sending module is configured to send the correlation relationship between the plurality of the preset scrambling sequences and the range value of the number of the HARQ process(es) to the terminal.

In some embodiments, the second determination module includes a second determination sub-module.

The second determination sub-module is configured to determine the target scrambling sequence based on the number of the target HARQ process(es) and the correlation relationship between the plurality of the preset scrambling sequences and the range value of the number of the HARQ process(es).

In some embodiments, the apparatus further includes a fourth determination module.

The fourth determination module is configured to determine a bit value corresponding to the target information field based on a target range value of the number of the HARQ process(es) corresponding to the target scrambling sequence and the number of the target HARQ process(es).

Figure 12:
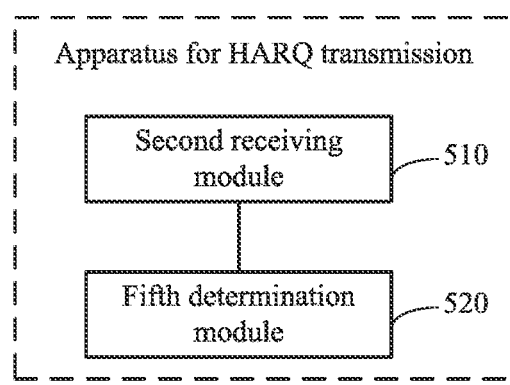
FIG. 12 is a block diagram of another apparatus for Hybrid Automatic Repeat reQuest (HARQ) transmission shown according to exemplary embodiments.

Referring to FIG. 12, which is a block diagram of another apparatus for Hybrid Automatic Repeat reQuest (HARQ) transmission shown according to exemplary embodiments. The apparatus is applied to the terminal, and includes a second receiving module and a fifth determination module.

The second receiving module 510 is configured to receive Downlink Control Information (DCI) sent by a satellite.

The fifth determination module 520 is configured to determine, in response to determination that a target scrambling sequence used to scramble the DCI belongs to one of a plurality of preset scrambling sequences, number of target HARQ process(es) supported by the terminal based on the DCI and the target scrambling sequence.

In some embodiments, the apparatus further includes a reporting module.

The reporting module is configured to report terminal capability information to the satellite.

In some embodiments, the fifth determination module further includes a third determination sub-module and a fourth determination sub-module.

The third determination sub-module is configured to determine a target range value of number of HARQ process(es) corresponding to the target scrambling sequence based on a correlation relationship between the plurality of the preset scrambling sequences and a range value of number of the HARQ process(es).

The fourth determination sub-module is configured to determine the number of the target HARQ process(es) based on a bit value of the target information field in the DCI and the target range value. Herein, the target information field is an information field used to indicate the number of the HARQ process(es) in the DCI.

In some embodiments, the apparatus further includes at least one of the followings.

A third receiving module configured to receive the correlation relationship, sent by the satellite, between the plurality of the preset scrambling sequences and the range value of the number of the HARQ process(es).

A sixth determination module configured to determine the correlation relationship between the plurality of the preset scrambling sequences and the range value of the number of the HARQ process(es) according to a predetermined setting.

Apparatus embodiments basically corresponds to above method embodiments, references can be made to descriptions of the method embodiments for relevant content. The apparatus embodiments described above are only illustrative, in which modules described as separate parts can be or cannot be physically separated, and the parts displayed as modules can be or cannot be physical units. The parts can be located at one site, or they can be distributed to multiple network units. Some or all of the modules can be selected according to actual needs to achieve the purpose of the disclosed solution of the present disclosure. Those of ordinary skill in the art can understand and implement the solutions without creative efforts.

In some embodiments, the present disclosure also provides a computer-readable storage medium. The computer-readable storage medium stores a computer program which can be executed so as to implement the methods for Hybrid Automatic Repeat reQuest (HARQ) transmission at the satellite side.

In some embodiments, the present disclosure also provides a computer-readable storage medium. The computer-readable storage medium stores a computer program which can be executed so as to implement the methods for Hybrid Automatic Repeat reQuest (HARQ) transmission at the terminal side.

In some embodiments, the present disclosure also provides a device for Hybrid Automatic Repeat reQuest (HARQ) transmission, including a processor and a memory for storing instructions executable by the processor. The processor is configured to perform the methods for Hybrid Automatic Repeat reQuest (HARQ) transmission at the satellite side described above.

Figure 13:
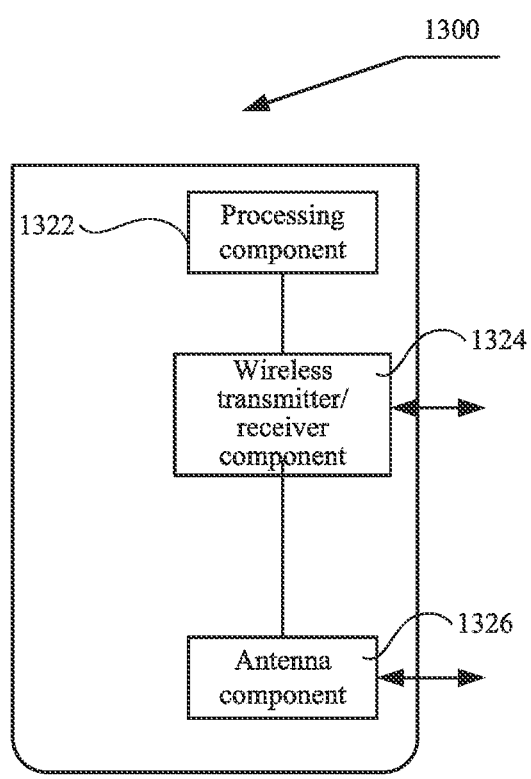
FIG. 13 is a schematic structural diagram of a device for Hybrid Automatic Repeat reQuest (HARQ) transmission shown according to exemplary embodiments of the present disclosure.

FIG. 13 is a schematic structural diagram of a device 1300 for Hybrid Automatic Repeat reQuest (HARQ) transmission shown according to exemplary embodiments. As shown in FIG. 13, device 1300 may be provided as a satellite. Referring to FIG. 13, the device 1300 includes a processing component 1322, a wireless transmitter/receiver component 1324, an antenna component 1326, and a signal processing part specific to a wireless interface. The processing component 1322 may further include one or more processors.

One processor of the processing components 1322 may be configured to perform the methods for Hybrid Automatic Repeat reQuest (HARQ) transmission at the satellite side described above.

In some embodiments, the present disclosure also provides a device for Hybrid Automatic Repeat reQuest (HARQ) transmission, including a processor and a memory for storing instructions executable by the processor. The processor is configured to perform the methods for Hybrid Automatic Repeat reQuest (HARQ) transmission at the terminal side described above.

Figure 14:
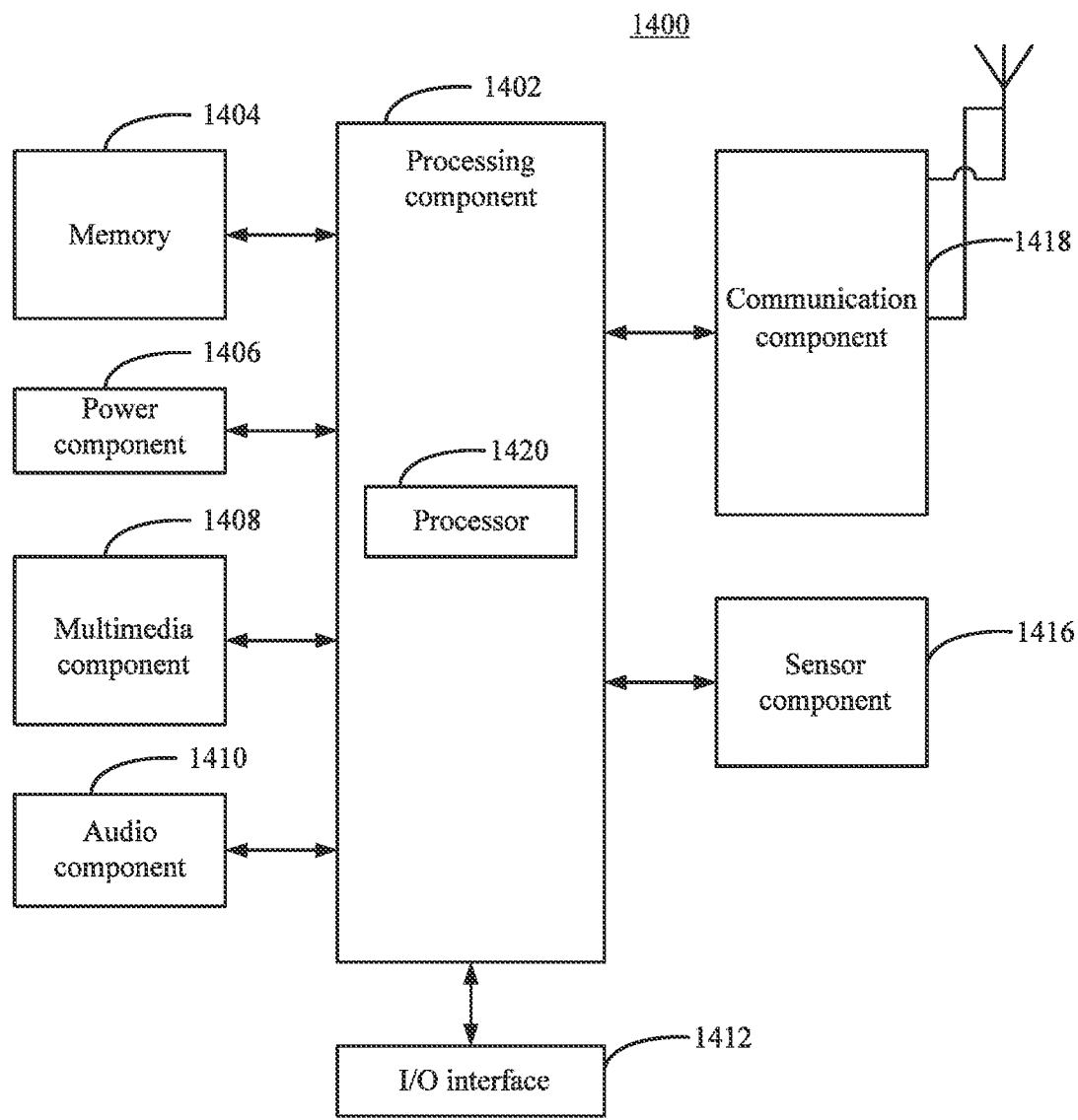
FIG. 14 is a schematic structural diagram of another device for Hybrid Automatic Repeat reQuest (HARQ) transmission shown according to exemplary embodiments of the present disclosure.

FIG. 14 is a schematic structural diagram of an electronic device 1400 shown according to exemplary embodiments. For example, the electronic device 1400 may be a terminal.

Referring to FIG. 14, the electronic device 1400 may include one or more of the following components: a processing component 1402, a memory 1404, a power component 1406, a multimedia component 1408, an audio component 1410, an input/output (I/O) interface 1412, a sensor component 1416, and a communication component 1418.

The processing component 1402 typically controls the overall operation of the electronic device 1400, such as operations associated with display, telephone call, data communication, camera operation, and recording operations. The processing component 1402 may include one or more processors 1420 to execute instructions to complete all or part of the above described methods for Hybrid Automatic Repeat reQuest (HARQ) transmission. In addition, the processing component 1402 may include one or more modules to facilitate interactions between the processing component 1402 and other components. For example, the processing component 1402 may include a multimedia module to facilitate interaction between the multimedia component 1408 and the processing component 1402. As another example, the processing component 1402 can read executable instructions from the memory to implement the steps of a method for Hybrid Automatic Repeat reQuest (HARQ) transmission provided by above embodiments.

The memory 1404 is configured to store various types of data to support operations in the electronic device 1400. Examples of such data include instructions, contact data, phone book data, messages, pictures, videos, and the like for any application or method operating on the electronic device 1400. The memory 1404 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 1406 provides power for various components of the electronic device 1400. The power component 1406 may include a power management system, one or more power supplies, and other components associated with generating, managing, and distributing power for the electronic device 1400.

The multimedia component 1408 includes a display screen providing an output interface between the electronic device 1400 and the user. In some embodiments, the multimedia component 1408 includes a front camera and/or a rear camera. When the electronic device 1400 is in operation mode, such as shooting mode or video mode, the front camera and/or rear camera can receive external multimedia data. Each front camera and rear camera can be a fixed optical lens system or have focal length and optical zoom capability.

The audio component 1410 is configured to output and/or input audio signals. For example, the audio component 1410 includes a microphone (MIC), which is configured to receive an external audio signal when the electronic device 1400 is in an operation mode, such as a calling mode, a recording mode, and a voice recognition mode. The received audio signal may be further stored in memory 1404 or transmitted via communication component 1418. In some embodiments, the audio component 1410 also includes a speaker for outputting audio signals.

The I/O interface 1412 provides an interface between the processing component 1402 and peripheral interface modules, which can be a keyboard, click wheel, button, etc. These buttons may include, but are not limited to, the Home button, Volume button, Start button, and Lock button.

The sensor component 1416 includes one or more sensors for providing various aspects of condition evaluation for the electronic device 1400. For example, the sensor component 1416 can detect an open/closed state of the electronic device 1400, relative positioning of the components. The component is, for example, a display and a keypad of the electronic device 1400. The sensor component 1416 can also detect changes in the position of the electronic device 1400 or one component of the electronic device 1400, presence or absence of the user's contact with the electronic device 1400, orientation or acceleration/deceleration of the electronic device 1400 and temperature change of the electronic device 1400. The sensor component 1416 may include a proximity sensor configured to detect the presence of nearby objects without any physical contact. The sensor component 1416 may also include a light sensor, such as a CMOS or CCD image sensor, for use in imaging applications. In some embodiments, the sensor component 1416 may also include an acceleration sensor, a gyroscope sensor, a magnetic sensor, a pressure sensor, or a temperature sensor.

The communication component 1418 is configured to facilitate wired or wireless communication between the electronic device 1400 and other devices. The electronic device 1400 can access wireless networks based on any communication standards, such as WiFi, 2G, 3G, 4G or 5G, or a combination thereof. In exemplary embodiments, the communication component 1418 receives a broadcast signal or broadcast related information from an external broadcast management system via a broadcast channel. In exemplary embodiments, the communication component 1418 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In exemplary embodiments, the electronic device 1400 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for performing above methods for Hybrid Automatic Repeat reQuest (HARQ) transmission.

In exemplary embodiments, a non-transitory computer-readable storage medium including instructions is also provided, such as a memory 1404 including instructions, which can be executed by the processor 1420 of the electronic device 1400 to complete the wireless charging method. For example, the non-transitory computer-readable storage medium can be ROM, random access memory (RAM), CD-ROM, tapes, floppy disks, optical data storage devices, etc.

Other embodiments of the present disclosure will readily occur to those skilled in the art upon consideration of the specification and practice of embodiments disclosed herein. The present disclosure is intended to cover any variations, uses, or adaptations of the disclosure that follow the general principles of the present disclosure and include common general knowledge or techniques in the technical field not disclosed by the disclosure. The specification and examples are to be regarded as exemplary only, with the true scope and spirit of the disclosure being indicated by the appended claims.

Obviously, numerous modifications and variations of the present invention are possible in light of the above teachings. It is therefore to be understood that within the scope of the appended claims, the invention may be practiced otherwise than as specifically described herein.

What is claimed is:

1. A method for Hybrid Automatic Repeat reQuest (HARQ) transmission, applied to a satellite, comprising:
    determining number of target HARQ process(es) supported by a terminal;
    determining a target scrambling sequence in response to the number of the target HARQ process(es) being greater than a target number, wherein the target number is a maximum value indicated by a target information field configured to indicate number of HARQ process(es) in Downlink Control Information (DCI); and
    sending the DCI scrambled through the target scrambling sequence to the terminal.

2. The method according to claim 1, wherein determining the number of the target HARQ process(es) supported by the terminal further comprises:

determining the number of the target HARQ process(es) supported by the terminal based on terminal capability information reported by the terminal.

3. The method according to claim 1, further comprising: determining a correlation relationship between a plurality of preset scrambling sequences and a range value of the number of the HARQ process(es).

4. The method according to claim 3, further comprising: sending the correlation relationship between the plurality of the preset scrambling sequences and the range value of the number of the HARQ process(es) to the terminal.

5. The method according to claim 3, wherein determining the target scrambling sequence comprises:
determining the target scrambling sequence based on the number of the target HARQ process(es) and the correlation relationship between the plurality of the preset scrambling sequences and the range value of the number of the HARQ process(es).

6. The method according to claim 1, further comprising: determining a bit value corresponding to the target information field based on a target range value of the number of the HARQ process(es) corresponding to the target scrambling sequence and the number of the target HARQ process(es).

7. The method according to claim 1, further comprising: receiving terminal capability information reported by the terminal.

8. A method for Hybrid Automatic Repeat reQuest (HARQ) transmission, applied to a terminal, comprising:
receiving Downlink Control Information (DCI) sent by a satellite;
determining whether a target scrambling sequence used to scramble the DCI belongs to one of a plurality of preset scrambling sequences; and
in the case that the target scrambling sequence used to scramble the DCI belongs to one of the plurality of preset scrambling sequences, deterring number of target HARQ process(es) supported by the terminal based on the DCI and the target scrambling sequence;
wherein determining the number of the target HARQ process(es) supported by the terminal based on the DCI and the target scrambling sequence comprises:
determining a target range value of number of HARQ process(es) corresponding to the target scrambling sequence based on a correlation relationship between the plurality of the preset scrambling sequences and a range value of the number of the HARQ process(es); and
determining the number of the target HARQ process(es) based on a bit value of a target information field in the DCI and the target range value, wherein the target information field is an information field configured to indicate the number of the HARQ process(es) in the DCI.

9. The method according to claim 8, further comprising: reporting terminal capability information to the satellite.

10. The method according to claim 8, further comprising: receiving the correlation relationship between the plurality of the preset scrambling sequences and the range value of the number of the HARQ process(es) sent by the satellite.

11. The method according to claim 8, further comprising: determining the correlation relationship between the plurality of the preset scrambling sequences and the range value of the number of the HARQ process(es) according to a predetermined setting.

12. A device for Hybrid Automatic Repeat reQuest (HARQ) transmission, comprising:
a processor; and
a memory for storing instructions executable by the processor;
wherein the processor is configured to perform the method for HARQ transmission according to claim 8.

13. The device according to claim 12, wherein the processor is further configured to:
receive the correlation relationship between the plurality of the preset scrambling sequences and the range value of the number of the HARQ process(es) sent by the satellite.

14. The device according to claim 12, wherein the processor is further configured to:
determine the correlation relationship between the plurality of the preset scrambling sequences and the range value of the number of the HARQ process(es) according to a predetermined setting.

15. A device for Hybrid Automatic Repeat reQuest (HARQ) transmission, comprising:
a processor; and
a memory for storing instructions executable by the processor;
wherein the processor is configured to:
determine number of target HARQ process(es) supported by a terminal;
determine a target scrambling sequence in response to the number of the target HARQ process(es) being greater than a target number, wherein the target number is a maximum value indicated by a target information field configured to indicate number of HARQ process(es) in Downlink Control Information (DCI); and
send the DCI scrambled through the target scrambling sequence to the terminal.

16. The device according to claim 15, wherein the processor is further configured to:
determine the number of the target HARQ process(es) supported by the terminal based on terminal capability information reported by the terminal.

17. The device according to claim 15, wherein the processor is further configured to:
determine a correlation relationship between a plurality of preset scrambling sequences and a range value of the number of the HARQ process(es).

18. The device according to claim 17, wherein the processor is further configured to:
send the correlation relationship between the plurality of the preset scrambling sequences and the range value of the number of the HARQ process(es) to the terminal.

19. The device according to claim 17, wherein the processor is further configured to:
determine the target scrambling sequence based on the number of the target HARQ process(es) and the correlation relationship between the plurality of the preset scrambling sequences and the range value of the number of the HARQ process(es).

20. The device according to claim 15, wherein the processor is further configured to:
determine a bit value corresponding to the target information field based on a target range value of the number of the HARQ process(es) corresponding to the target scrambling sequence and the number of the target HARQ process(es).

* * * * *